United States Patent
Theriault et al.

[11] Patent Number: 5,843,483
[45] Date of Patent: *Dec. 1, 1998

[54] APPARATUS FOR FORMING A FOOT ORTHOTIC

[75] Inventors: Philip G. Theriault, Littletown; Walter J. Subsick, Jr., Lincoln, both of Mass.

[73] Assignee: Gleason's Orthotics, Inc., Lexington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 840,267

[22] Filed: Apr. 14, 1997

[51] Int. Cl.$^6$ .................................................. B29C 51/28
[52] U.S. Cl. ..................... 425/2; 264/314; 264/DIG. 30; 425/170; 425/389
[58] Field of Search ............................... 425/2, 389, 170; 264/314, DIG. 30

[56] References Cited

U.S. PATENT DOCUMENTS

| | | | |
|---|---|---|---|
| 964,119 | 7/1910 | Norton et al. | 425/2 |
| 1,884,529 | 10/1932 | Benner et al. | 264/314 |
| 3,458,898 | 8/1969 | Casparis | 425/2 |
| 5,083,910 | 1/1992 | Abshire | 425/2 |

*Primary Examiner*—Patrick Ryan
*Assistant Examiner*—Joseph Leyson
*Attorney, Agent, or Firm*—Paul J. Cook

[57] ABSTRACT

An apparatus for forming a foot orthotic is provided including a housing for an inflatable bladder. The bladder is inflated with a hand held compressible bulb. A heat softened orthotic blank is positioned between a patient's foot and the bladder which is inflated to conform the blank to the bottom surface of the foot. The shaped blank is allowed to cool to render it nondeformable at room temperature.

6 Claims, 4 Drawing Sheets

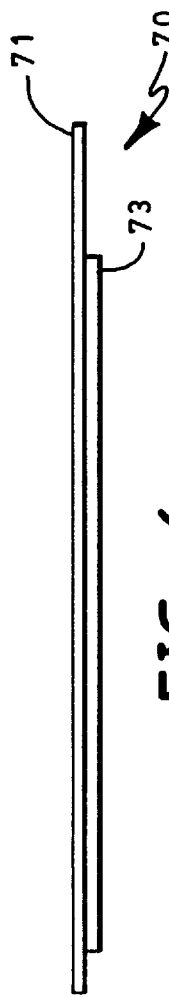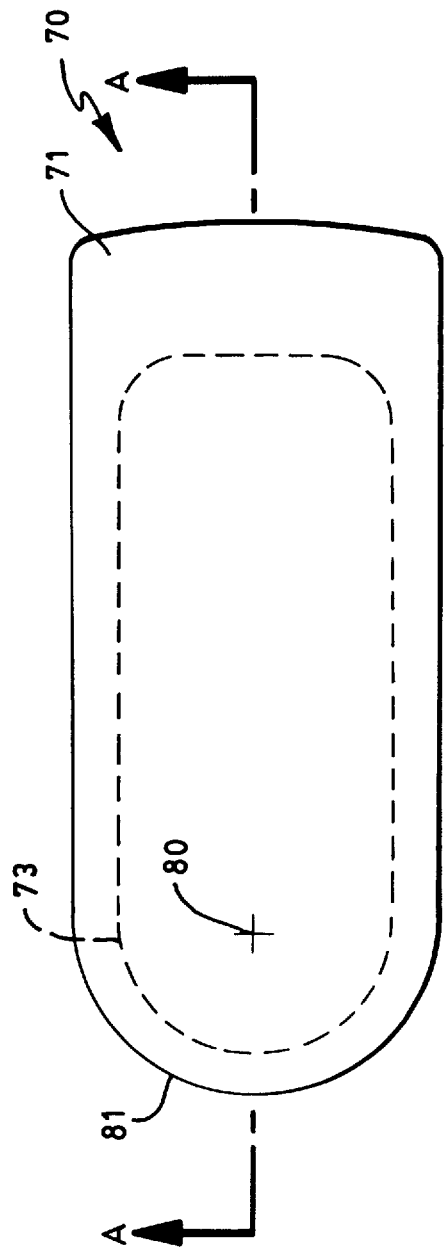

APPARATUS FOR FORMING A FOOT ORTHOTIC

BACKGROUND OF THE INVENTION

This invention relates to a method and apparatus for making corrected custom molds for the human feet, for which orthopedic devices or orthoses, for the foot can be fabricated. Such devices are commonly referred to as "foot orthotics".

The human foot is formed of a complex array of twenty-six bones. The human foot performs two main functions, support and locomotion. Ideally, the foot functions as a tripod, supporting the body's weight on the heel and across the metatarsal arch. The foot is capable of a wide range of movement. Under stressed conditions, one of the most important of these movements is the side to side rotation of the foot, either to the outside ("supination") or to the inside ("pronation"). This rotation increases or decreases the height of the foot's arch, and if excessive, can put the foot in a weakened, unbalanced, condition. The foot is said to be in a "neutral" position when it is neither pronated nor supinated, i.e., then the heel bone is vertical and is directly in line with the talus bone above it. The neutral position provides good skeletal support for the body's weight.

It is well known that activities which involve movement of the body, including walking, running, skiing, and skating, place very large stresses on the bones and joints of the leg and the foot. These stresses are larger when the bones and joints of the foot are not in the proper position, and are maximized when the knee is additionally out of proper alignment.

Improper foot structure and position have been treated in part through custom-molded foot orthotics which fit into the shoes and which support the foot, or parts of the foot, in a "corrected" position. This corrective function of a foot orthotic distinguished it from a mass-produced foot pad or other shoe insert designed strictly for comfort.

Orthotics are made from a custom impression or image of the foot. Impressions are typically made by plaster casting or by a mold of low density foam. Images of the feet also can be made by scanning or digitizing the foot and capturing that data in a computer database. Impressions are usually made with the subtalar joint in the neutral position. Depending on the process used, impressions can be taken in a weight bearing, semi-weight bearing or non-weight bearing position. At this point, generally through a practitioner's diagnosis, adjustments will be made to the impression or image to correct for biomechanical deficiencies. These adjustments are referred to as 'postings'.

Postings can be placed into two general categories. Postings which involve modifications to the foot form are generally considered intrinsic postings as making an excavation in the foot form to accommodate a dropped metatarsal head. The result is a positive metatarsal lift in the orthotic molded over this form. The opposite type of posting is referred to as extrinsic. An example of this modification is to place a pad on the foot form directly over the dropped metatarsal head. An orthotic molded over this form has a relief pocket under the metatarsal head.

Other modifications can be added to an orthotic. These include but are not limited to rearfoot and forefoot wedges, heel lifts and metatarsal raise pads.

Orthotics can be fabricated either manually or by an automated process. Typically, a laboratory is used to fabricate the appliance. Most labs have cast scanning capability that work either with their own milling machine or a downstream miller. Due to the high cost of CAD-CAM milling, labs may not be able to afford their own miller. Central or shared fabrication facilities are common. Relay stations exist which scan and modem data to a central fabrication facility. Quite often casts are being measured, interpreted and then milled in three different sites and quite possibly by three different organizations. Usually, three or four visits to the medical practitioner are required while the shape of the patient's foot adjusts to the orthotic in use to progress to a final foot shape most comfortable to the patient.

A wide spectrum of materials are available to the practitioner to fabricate an orthotic. All orthotic materials have a certain degree of flexibility and a certain degree of rigidity. Materials as common as leather and cork can be used to fabricate orthotics. Other materials such as ethylene vinyl acetate (EVA), polyethylene and polypropylene are employed. These materials can be used alone or in combination with each other. Also important to the function of the orthotic is thickness and form.

There are several problems associated with the existing methods for fabricating foot orthotics. The single largest disadvantage is the impression processes employed. They do little to change the positioning and/or alignment of components of the foot. The molding and scanning processes used simply duplicate the structure of the foot. All modifications are done through the evaluation of the practitioner. Education and experience aid a practitioner in making proficient adjustments. However, these adjustments are still based on judgement.

Another disadvantage to the present processes is the time delay associated with fabricating the orthotic. Once the impression of a person's feet have been taken, a wait of several days or even several weeks is usually required before the orthotic is finished. When a patient has come to a practitioner with a foot problem, they usually require a remedy as soon as possible.

The break-in period associated with most presently available orthotics is also a disadvantage. Since modifications and adjustments to the impression are based on the inexact ability and judgement of the practitioner, the fabricated orthotic is often too uncomfortable for a person to wear for long periods of time when they first begin to wear it. Often, patients are told to wear the orthotics for short periods of time every day, increasing the amount of time over a period of weeks.

It has been proposed in U.S. Pat. No. 1,044,171 to form an arch support by utilizing a flexible bladder upon which an arch support blank rests. The bottom of the patient's foot is placed on the arch support and the arch support is heated by heating gas from a compressed gas supply which then is directed into the bladder. The bladder becomes inflated while the blank is softened by the heated gas. The softened blank then is conformed to the shape of the patient's arch by the pressurized bladder. The gas directed to the bladder is heated from a heater which heats the conduit through which gas is supplied to the bladder. After the blank is conformed to the shape of the patient's arch, the heated gas in the bladder is replaced by cool gas directed into the bladder while the heater is inactivated. The cool gas causes the shaped blank to harden into a permanent shape at normal room temperature.

The method and apparatus described in U.S. Pat. No. 1,044,171 has disadvantages which render their use undesirable. Since the apparatus requires a source of compressed gas, the storage tank for the compressed gas must be capable of withstanding high pressure. This requirement, in turn, necessitates use of a strong and heavy material for the storage tank. Also, since the conduit between the gas supply must be heated, it must be formed of material, most usually a metal which must conduct heat but which is not degraded by heat. Thus, the conduit, must be formed of a heavy material. These two requirements render the apparatus nonportable by hand. This requirement is undesirable since the apparatus cannot be delivered easily to the site of the patient.

In addition, since the gas control apparatus is positioned beneath the patient's foot to accommodate the heater, it is inconvenient to access the control apparatus. In any event, the control apparatus cannot be controlled by the patient who is best able to determine the pressure at which the foot is most comfortable when forming the foot orthotic.

In addition, since the patented method and apparatus require the blank to be heated while in contact with the patient's foot, portions of the blank remote from the bladder such as at the back of the heel or at the front of the toes are difficult to heat in that longer heat times and/or higher temperatures are required. Neither process condition is comfortable for the patient.

Furthermore, the patented method and apparatus does not provide a record of conditions at which an orthotic is formed. This lack of a record hinders the medical practitioner during patient visits subsequent to the first visit when the orthotic is reshaped. If such a record existed, the medical practitioner would be provided with a convenient starting point condition to effect the orthotic reshaping.

Accordingly, it would be desirable to provide a method for forming foot orthotics with an apparatus which is hand portable. In addition, it would be desirable to provide such a method and apparatus which quickly and accurately provides an orthotic which conforms with the entire weight supporting surface of the foot. Furthermore, it would be desirable to provide such a method and apparatus which can be easily adjusted to a variety of foot sizes. Also, it would be desirable to provide such a method and apparatus which provide a record of orthotic forming conditions over a plurality of orthotic forming events.

SUMMARY OF THE INVENTION

The present invention provides a method for forming a foot orthotic with a hand portable apparatus. The apparatus comprises an inflatable bladder, means for positioning a seated patient's foot in a stationary position on the bladder and means for positioning a heat softened orthotic blank between the bladder and the patient's foot. The bladder interior is pressurized by hand held pressuring means either by the patient or by a person assisting the patient. The hand held pressurizing means includes a hand-deformable resilient bulb, a one way valve, which when open, provides fluid communication between the bulb interior and the bladder through a conduit. When the bladder is to be depressurized, such as after the orthotic is removed, a valve, such as a release valve in fluid communication with the conduit is opened to effect removal of pressurized gas from the bladder. One or two pressurizable bladders are provided so that orthotics can be formed for the patient for one or both feet. In one aspect of this invention, a pressure gauge for each bladder which indicates the pressure at which the formed orthotic is rendered non-deformable at normal room temperature.

In the operation of the method and apparatus of this invention, an orthotic blank, heated to above its heat deformation temperature is positioned between a bladder and a seated patient's foot. The hand held bulb then is hand-squeezed to inflate the bladder to a pressure such that the blank is deformed to a form to conform to the bottom surface of the foot and to positively raise the bony or structural parts of the foot, including the arch of the patient. Bladder inflation then is stopped and the formed blank is allowed to cool to a temperature below its heat deformation temperature. The pressure at which bladder inflation is stopped is noted from the gauge which indicates the bladder pressure. The release valve then is opened to allow the pressure within the bladder to be reduced to substantially atmospheric pressures. The apparatus then is in condition for a repeated operation to form a second foot orthotic.

Since a storage tank for pressurized gas and conduits which are capable of being heated to a temperature to soften a blank are eliminated, the apparatus of this invention can be rendered hand portable. In addition, since the conduit directing air to the bladder can be formed of a nonmetallic flexible material such as rubber or a polymeric composition, the hand squeezable bulbs can be located in a comfortable position for the user rather than being located in a remote position, such as beneath the patient's foot. Furthermore, a record of the bladder pressure at which the orthotic is formed provides the user with a convenient starting pressure for the next orthotic fitting during which the previously formed orthotic is further deformed to accommodate changes in the patient's foot shape primarily due to use of the previously formed orthotic.

BRIEF DESCRIPTION OF THE DRAWINGS

FIG. 5 is a top view of an orthotic blank useful with the present invention.

FIG. 6 is a cross sectional view of the blank of FIG. 5 taken along line 6—6.

DESCRIPTION OF SPECIFIC EMBODIMENTS

The present method and apparatus of this invention effects repositioning the metatarsal bones by working in conjunction with the foot muscles. The pressures created by the inflated bladder distribute the forces in a manner consistent with the foot's natural shape. The method and apparatus of this invention eliminates the need to manually incorporate postings or additions and wedges. By repositioning the metatarsals, the calcaneus returns to a normal position. In turn, this provides correct alignment of the subtalar component and therefore the entire body posture.

After the initial fitting, the patient typically requires two additional adjustments. Adjustments are made by taking a new impression either from the previously formed orthotic or a new orthotic blank with the inflated bladder. The typical time frame between an initial fitting and subsequent adjustments is two to three weeks. This allows time for the muscles in the foot to work in conjunction with the orthotic to bring the metatarsals back to a more normal position.

Figure 1:
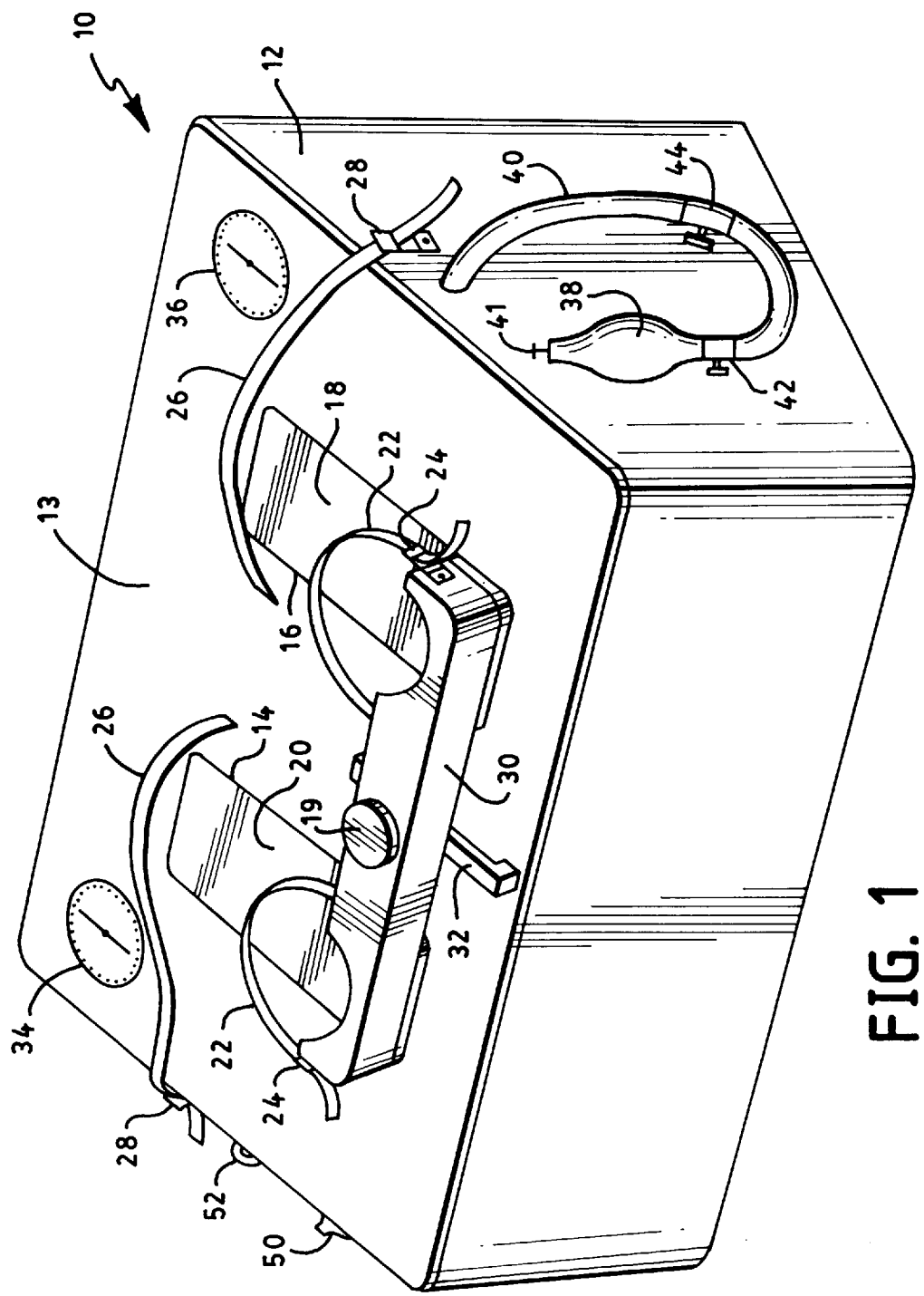
FIG. 1 is an isometric view of the apparatus of this invention.
Figure 2:
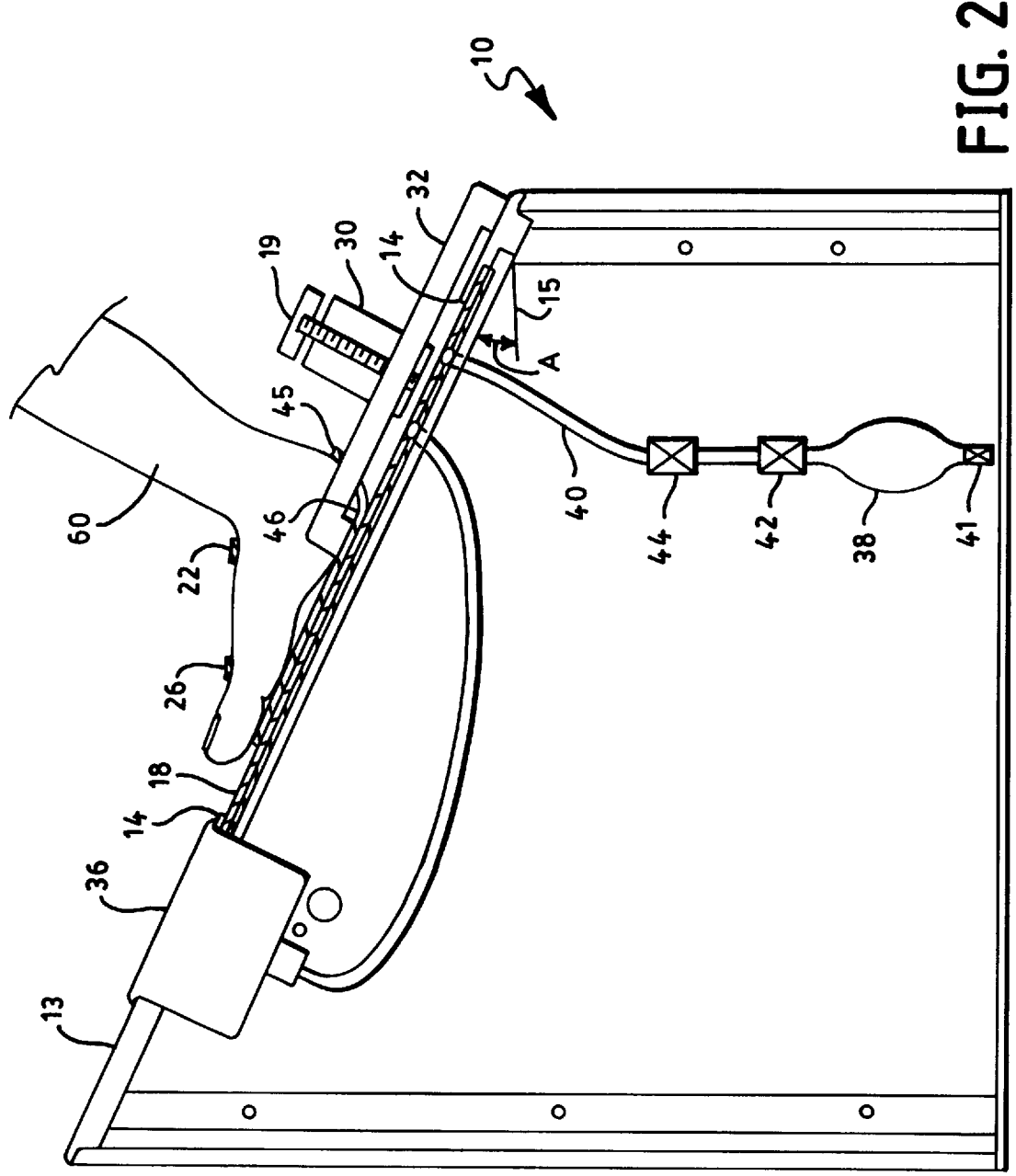
FIG. 2 is a cross-section view of this invention showing the connection between a bladder and a hand held pressurizing bulb.

Referring to FIGS. 1 and 2, the apparatus of this invention 10 includes a housing 12 having a top plate 13. Top plate 13 is positioned at an angle A between about 0° and 45°, preferably between about 15° and 30° from the horizontal 15 so that a seated patient exerts little or no body weight, other than the weight of the foot on a bladder 18 or 20. This position provides comfort for the patient and accuracy of orthotic fit. Inflatable bladders 18 and 20 are received within housing openings 14 and 16. Straps 22 and buckles 24 are positioned to secure an ankle and straps 26 and buckle 28 are positioned to secure a toe section of a foot. A heel support 30 is slideably mounted on slide bar 32. The position of heel support 30 is adjusted by loosening thumb screw 19 to accommodate feet of varying sizes on bladders 18 and 20. When the desired foot position is established, screw 19 is tightened to set the position of heel support 30. Gauge 36 is connected to the interior of bladder 18 through conduit 40 and indicates the pressure within bladder 18, typically between 0 and about 5 psi. Gauge 34, of the same type as gauge 36, indicates the pressure within bladder 20.

Hand held compression bulb 38, made of a flexible material such as rubber, is in fluid communication with conduit 40 which, in turn is in fluid communication with the interior of bladder 18. Shut off valve 44 is opened while one way valve 41 is closed when the pressure on bulb 38 is increased to admit pressurized gas into conduit 40. When pressure on bulb 38 is decreased or eliminated, release valve 42 is closed to prevent pressurized gas from exiting bladder 18 and one way valve 41 is open to admit gas into the compression bulb 38. After the desired pressure in bladder 18 is attained during which time a heat-softened orthotic blank 46 (FIG. 2) becomes hardened so that it is nondeformable at room temperature, shut off valve 44 is opened to decrease pressure within bladder 18 to about atmospheric pressure.

As described above with reference to bulb 38 and bladder 18, bulb 50, connected to conduit 52 is also in fluid communication with one way valves, and a release valve which function as described above with reference bulb 38, valves 42 and 44 and bladder 18. Gauge 34 indicates pressure within bladder 20 and is of the same type as gauge 36.

Referring to FIG. 2, the method of this invention is described. A blank 46 for a foot orthotic previously heated to above its softening temperature is placed on bladder 18. The blank can be conveniently heated by immersing it in hot water or the like. A patient's foot 60 is positioned on the softened blank. The position of the heel rest 30 is moved when adjustable thumb screw 19 is loosened and is moved on slide bar 32. The foot 60 is positioned securely by straps 26 and 22. Bulb 38 then is hand squeezed to increase pressure within bladder 18 until the heated blank 46 comfortably conforms to the bottom surface of the foot 60. The bladder pressure is maintained until the formed blank is cooled below its heat softening temperature. The formed orthotic thus conforms to the shape of the bottom of foot 60 after the impaired bony and structural parts of the foot are raised at normal room temperature. The straps 22 and 26 are released to free the foot 60 and the pressure in bladder 18 is reduced by opening shut off valve 44.

Figure 3:
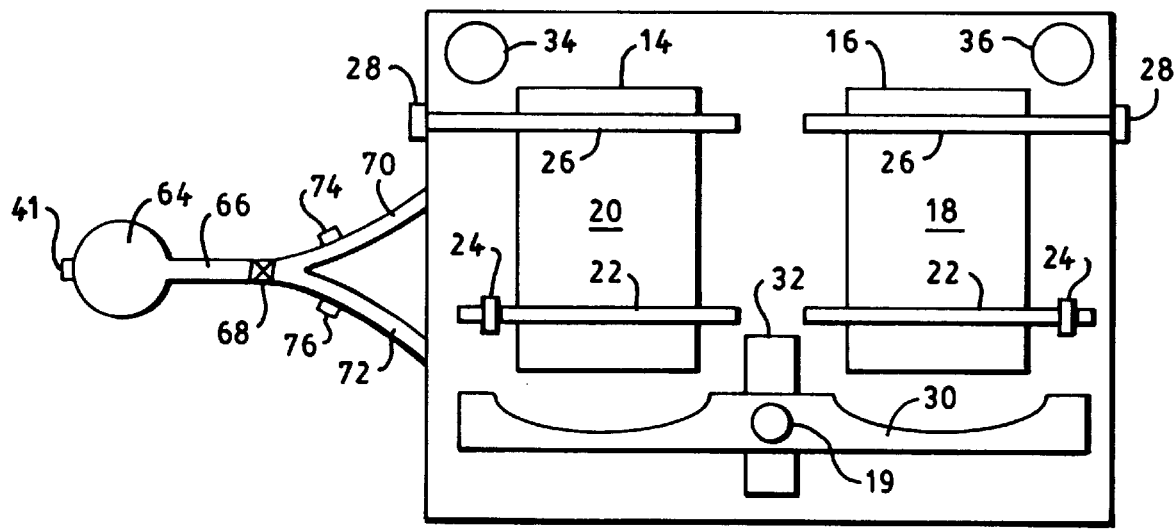
FIG. 3 is a top view of an alternative embodiment of this invention utilizing a three way valve.

Referring to FIG. 3, where the same reference numerals as used in FIG. 1 refer to the same elements, an alternative embodiment of this invention is illustrated utilizing a single hand squeezable bulb 64 for both bladders 18 and 20. The bulb 64 is in fluid communication with conduit 66, which, in turn, is in fluid communication with three way valve 68 which controls fluid communication between conduit 66 and conduits 70 and 72. Conduit 70 is in fluid communication with bladder 18 and conduit 72 is in fluid communication with bladder 20. Shut off valve 74 is in fluid communication with conduit 70 and shut off valve 76 is in fluid communication with conduit 72. Bulb 64 and release valves 74 and 76 and bladders 18 and 20 function in the same manner as described above. Three way valve 68 controls fluid pressure in bladder 18 and 20.

Figure 4:
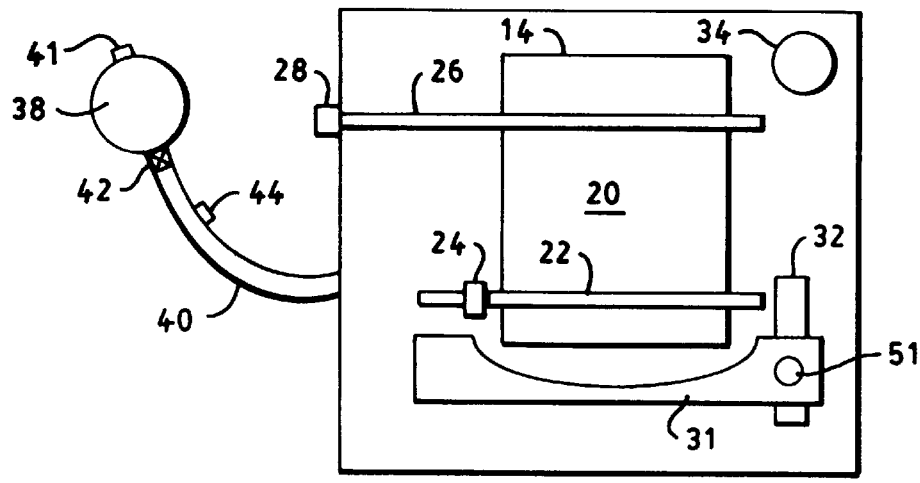
FIG. 4 is a top view of an alternative embodiment of this invention.

Referring to FIG. 4, an embodiment of this invention is shown which is capable of forming one foot orthotic at a time. Numerical designations the same as the numeral designations of FIG. 1 refer to the same elements. In operation, the patient's foot is placed on a heat softened orthotic precursor (not shown) which, in turn, is positioned on bladder 20. The foot is secured by straps 22 and 26 and buckles 24 and 28. The heel rest 31 is positioned by adjustable thumb screw 51 on slide bar 32. The screw 51 is secured on slide bar 32 when the foot is in the proper position. The bulb 38 then is hand squeezed to increase pressure within bladder 20 until the foot is desirably positioned in the orthotic precursor. The orthotic is then allowed to cool between its heat softening temperature so that the orthotic has a permanent shape at room temperature.

Referring to FIG. 5 and 6, a blank 70 is useful with the method and apparatus of this invention is illustrated. The blank includes two elements 71 and 73 adhered together or a single element shaped as shown. The first element 71 is shaped to the general shape of the interior bottom surface of a shoe. It is of necessity thin, i.e., between about 1/32 and about 3/32 inch thick. The first element 71 is stiffened by second element 73 which has a thickness between about 3/32 and about 5/32 inch. The width of the second element 73 is between about 70% and 100%, preferably between about 70% and about 80% of the width of the first element and a length between about 75% and about 85% of the length of the first element. The blank 70 is formed of a material having a softening temperature between about 65° C. and about 85° C., preferably between about 70° C. and about 80° C. The blank is formed from a heat softenable polymeric composition such as polyethylene, polypropylene, ethylene vinyl acetate (EVA), polytransisoprene or the like, preferably polytransisoprene composition such as is available from Smith & Nephew, Roylan, Inc., (of Germantown, Wis.) under the tradename San-Splint. The diameter of the curved heel section 81 from center 80 of the first element is between about 1 and about 1½ inch, preferably between about 1⅛ and 1⅜ inch. The diameter of the curved heel section 83 of the second element from center 80 is between about ¾ and about ¼ inch, preferably between about ⅞ and 1⅛ inch.

We claim:

1. A hand portable apparatus for forming a foot orthotic for a patient in a seated position which comprises:

a housing having a top surface positioned at an angle between about 0° and about 45° with reference to a horizontal surface upon which said apparatus rests, at least one inflatable bladder positioned at said top surface, means for inflating with a gas said at least one inflatable bladder with a hand held compressible bulb, having a one way valve, in fluid communication with said bladder through a hollow conduit having successively a release valve and a shut off valve to a pressure to raise bone portions of a foot of a patient to a normal position for said bone portions when said bladder is inflated in contact with a deformable blank for a foot orthotic in contact with said foot, means for seating said patient such that the seated patient exerts little or no body weight other than the weight of the foot on the bladder, and means for securing the foot of said patient in a stationary position during a time said foot is in contact with said deformable blank.

2. The apparatus of claim 1 including two inflatable bladders, each being in fluid communication with a separate hand held compressible bulb.

3. The apparatus of claim 1 including two inflatable bladders, each being in fluid communication with a single hand held compressible bulb.

4. The apparatus of any one of claims 1, 2 or 3 wherein said hollow conduit is formed from a flexible composition.

5. The apparatus of any one of claims 1, 2 or 3 including a pressure gauge which indicates pressure within said at least one inflatable bladder.

6. The apparatus of claim 4 including a pressure gauge which indicates pressure within said at least one inflatable bladder.

* * * * *